United States Patent
Ramsey et al.

(10) Patent No.: US 7,228,364 B2
(45) Date of Patent: Jun. 5, 2007

(54) SYSTEM AND METHOD OF SCSI AND SAS HARDWARE VALIDATION

(75) Inventors: Scott Ramsey, Austin, TX (US); Douglas Huang, Pflugerville, TX (US); Michael Mamo, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 38 days.

(21) Appl. No.: 10/875,762

(22) Filed: Jun. 24, 2004

(65) Prior Publication Data

US 2005/0289263 A1 Dec. 29, 2005

(51) Int. Cl.
*G06F 3/00* (2006.01)

(52) U.S. Cl. .......................... 710/10; 713/100
(58) Field of Classification Search ............. 710/8, 710/10, 14–19, 300; 713/1, 2, 100
See application file for complete search history.

(56) References Cited

U.S. PATENT DOCUMENTS

| | | | |
|---|---|---|---|
| 4,760,553 A | | 7/1988 | Buckley et al. |
| 5,850,539 A | * | 12/1998 | Cook et al. ............. 703/20 |
| 6,002,854 A | * | 12/1999 | Lynch et al. ............ 703/1 |
| 6,094,691 A | | 7/2000 | Burgard |
| 6,263,382 B1 | * | 7/2001 | Bartlett et al. .......... 710/10 |
| 6,671,802 B1 | * | 12/2003 | Ott ........................... 713/100 |
| 6,675,294 B1 | * | 1/2004 | Gupta et al. ............. 713/1 |
| 6,829,703 B1 | * | 12/2004 | Caswell et al. .......... 713/1 |
| 6,952,794 B2 | * | 10/2005 | Lu ............................. 714/7 |
| 2004/0073747 A1 | | 4/2004 | Lu | |

FOREIGN PATENT DOCUMENTS

| | | |
|---|---|---|
| EP | 0704804 | 4/1996 |
| EP | 1160665 | 12/2001 |
| EP | 1088274 | 3/2002 |
| WO | 97/45788 | 12/1997 |
| WO | 99/66409 | 12/1999 |

OTHER PUBLICATIONS

SCSI History for Wikipedia.*
Great Britain Search Report; GB/0512419.3; pp. 1.
Australian Patent Office Search Report for Application No. SG 200502785-9 (8 pages), Nov. 28, 2006.
Examination Report for Application No. GB0512419.3 (2 pages), Sep. 27, 2006.

* cited by examiner

*Primary Examiner*—Khanh Dang
(74) *Attorney, Agent, or Firm*—Baker Botts L.L.P.

(57) ABSTRACT

A system and method of SCSI and SAS hardware validation is disclosed. In one aspect, the present disclosure teaches a method of hardware validation in an information handling system including scanning an interconnection for hardware devices attached to the interconnection in an information handling system. The method further including determining compatibility of each hardware device place on the interconnection based on a supported device information matrix and a location of the hardware device in the information handling system. The method further including displaying a validation notification to a user for possible compatibility issues based on the determination.

20 Claims, 5 Drawing Sheets

| | Bit 0 | Bit 1 | Bit 2 | Bit 3 | Bit 4 | Bit 5 | Bit 6 | Bit 7 | |
|---|---|---|---|---|---|---|---|---|---|
| Offset 0x00 | POWER VAULT 220 SUPPORT? 0 | POWER VAULT 210 SUPPORT? 1 | INTERNAL BACKPLANE? 1 | RESERVED | RESERVED | RESERVED | RESERVED | RESERVED | ENCLOSURE OR BACKPLANE SUPPORT BYTE |
| Offset 0x01 | PERC 0 | PERC3 DC 0 | PERC3 QC 0 | PERC3 DI 1 | RESERVED | RESERVED | RESERVED | RESERVED | CONTROLLER SUPPORT BYTE 1 |
| Offset 0x02 | PERC 4 DC 0 | PERC4 DI 0 | RESERVED | RESERVED | RESERVED | RESERVED | RESERVED | RESERVED | CONTROLLER SUPPORT BYTE 2 |
| Offset 0x03 | RESERVED | RESERVED | RESERVED | RESERVED | RESERVED | RESERVED | RESERVED | RESERVED | [FUTURE] |

FIG. 4

SYSTEM AND METHOD OF SCSI AND SAS HARDWARE VALIDATION

TECHNICAL FIELD

The present disclosure relates generally to information handling systems and, more particularly, to a system and method of SCSI and SAS hardware validation.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One example of an information handling system is a storage system such as a small computer system interface (SCSI) storage system or a Serial Attached SCSI (SAS) storage system. Generally, a SCSI storage system includes a controller, hard disk drives and a SCSI accessed fault tolerant enclosure (SAF-TE). Whereas a SAS storage system may include a controller, hard disk drives and expanders that repeat or regenerate the SCSI signals and may provide electrical isolation. The SAS system typically uses a point to point link in lieu of a bus for the SCSI interconnector. The SCSI interconnections generally interact using an expander chip that may be transparent to the software, but not necessarily transparent to the hardware.

The SCSI and SAS storage systems typically follow a standard protocol for electronic interfacing. The protocol allows the storage system to communicate with the peripheral hardware devices such as the hard disks, tape drives, DC-ROM drives connected to the system.

However, despite adhering to a specification, the connected hardware devices may develop compatibility issues with the system based on the physical configuration of the system. For example, a compatibility issue may arise when a hard disk drive is moved from being attached to an internal backplane of a SCSI server to an attached enclosure. Because the internal backplane and enclosure use the same drive carrier, the hard disk drive is easily relocated between the different locations. However, by moving the hard disk drive between the locations, the physical configuration of the storage system is altered. Based on the new configuration, the hard disk drive may not function properly such as causing data loss that results in customer dissatisfaction.

SUMMARY

Thus, a need has arisen for system and method of SCSI bus hardware validation.

In accordance with teachings of the present disclosure, in some embodiments, the present disclosure teaches a method of hardware validation in an information handling system including scanning an interconnection for hardware devices attached to the interconnection in an information handling system. The method further includes determining interconnection compatibility of each hardware device placed on the interconnection based on a supported device information matrix and a location of the hardware device in the information handling system. The method further includes displaying a validation notification to a user for possible compatibility issues based on the determination.

In other embodiments, an information handling system includes a system for small computer system interface (SCSI) and SAS hardware validation in an information handling system including an input/output (I/O) expander operable to receive one or more hardware devices such that the one or more hardware devices communicatively couples to a SCSI interconnection in the information handling system. The system further includes a supported device information matrix stored in each of the one or more hardware devices. The supported device information matrix operable to indicate compatibility of the respective hardware device placed within the information handling system. The system further includes a controller communicatively coupled to the SCSI interconnection. The controller operable to scan the SCSI interconnection for the one or more hardware devices and to determine compatibility of the one or more hardware devices as configured in the information handling system based on the supported device information matrix.

In further embodiments, an information handling system includes a processor and a memory communicatively coupled to the processor. The memory and processor operably coupled to a bus. The information handling system further includes an input/output (I/O) expander receives one or more hardware devices such that the one or more hardware devices communicatively couple to the bus via the I/O expander. The information handling system further includes a supported device information matrix stored in each of the one or more hardware devices. The supported device information matrix indicates compatibility between a location of the respective hardware device and a configuration of the information handling system. The information handling system further includes a controller communicatively coupled to the bus. The controller operable to scan the bus for the one or more hardware devices and to determine compatibility of the one or more hardware devices as configured in the information handling system based on the supported device information matrix.

Important technical advantages of certain embodiments of the present invention include a notification of possible compatibility problems for SCSI and non SCSI components associated with an information handling system. Because hardware devices may be interchangeably moved into different configurations, it is assumed that the device will work properly in every configuration without compatibility issues. By including a compatibility database in each hardware device, a controller in the information handling system may determine whether each hardware device is located in a compatible configuration. Based on this determination, a user can be notified of possible compatibility issues such as configuration problems that result in loss of information.

All, some, or none of these technical advantages may be present in various embodiments of the present invention. Other technical advantages will be apparent to one skilled in the art from the following figures, descriptions, and claims.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
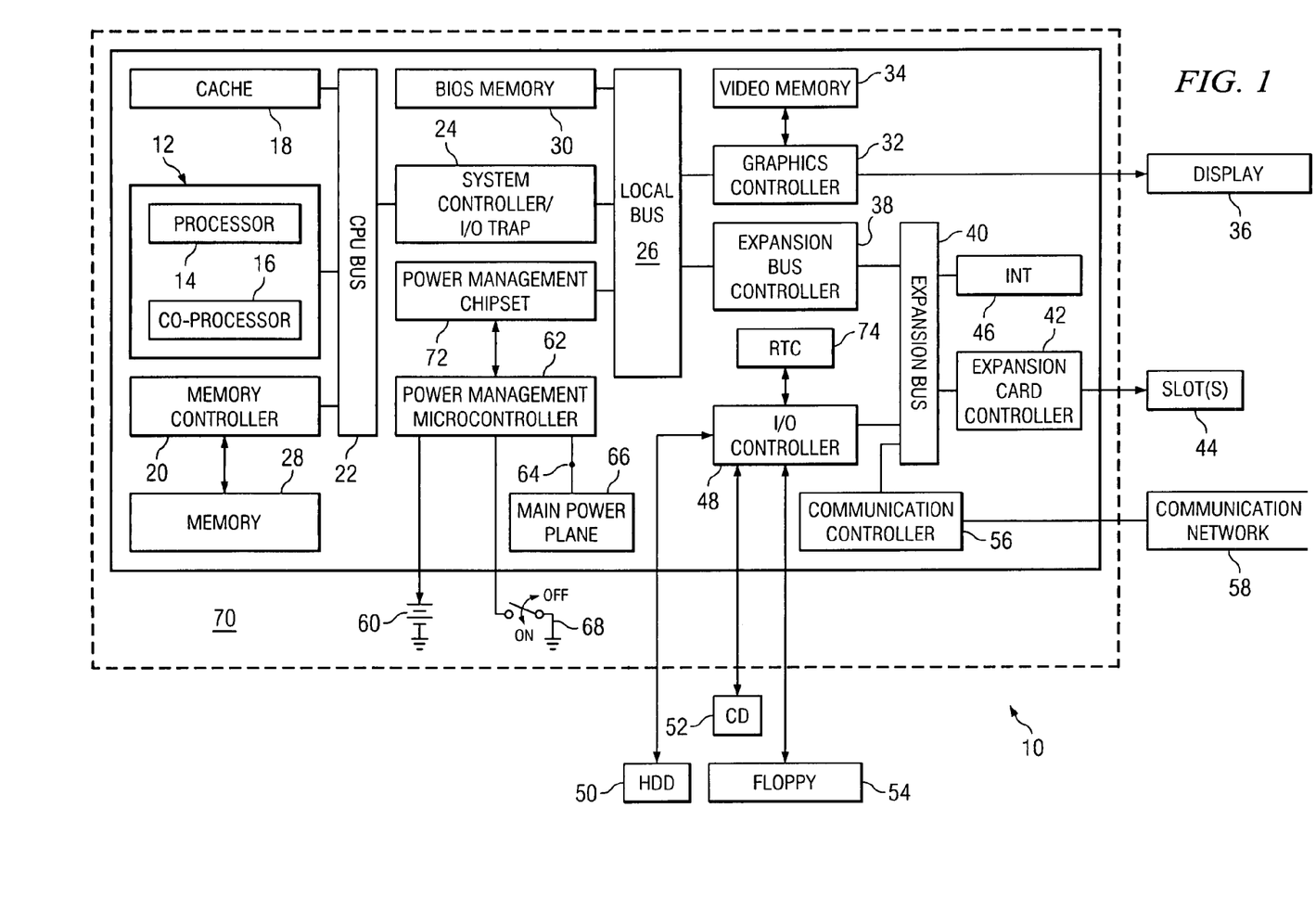
FIG. 1 is a block diagram showing an information handling system, according to teachings of the present disclosure.

Referring first to FIG. 1, a block diagram of information handling system 10 is shown, according to teachings of the present disclosure. Information handling system 10 or computer system preferably includes at least one microprocessor or central processing unit (CPU) 12. CPU 12 may include processor 14 for handling integer operations and coprocessor 16 for handling floating point operations. CPU 12 is preferably coupled to cache 18 and memory controller 20 via CPU bus 22. System controller I/O trap 24 preferably couples CPU bus 22 to local bus 26 and may be generally characterized as part of a system controller.

Main memory 28 of dynamic random access memory (DRAM) modules is preferably coupled to CPU bus 22 by a memory controller 20. Main memory 28 may be divided into one or more areas such as system management mode (SMM) memory area (not expressly shown).

Basic input/output system (BIOS) memory 30 is also preferably coupled to local bus 26. FLASH memory or other nonvolatile memory may be used as BIOS memory 30. A BIOS program (not expressly shown) is typically stored in BIOS memory 30. The BIOS program preferably includes software which facilitates interaction with and between information handling system 10 devices such as a keyboard (not expressly shown), a mouse (not expressly shown), or one or more I/O devices. BIOS memory 30 may also store system code (note expressly shown) operable to control a plurality of basic information handling system 10 operations.

Graphics controller 32 is preferably coupled to local bus 26 and to video memory 34. Video memory 34 is preferably operable to store information to be displayed on one or more display panels 36. Display panel 36 may be an active matrix or passive matrix liquid crystal display (LCD), a cathode ray tube (CRT) display or other display technology. In selected applications, uses or instances, graphics controller 32 may also be coupled to an integrated display, such as in a portable information handling system implementation.

Bus interface controller or expansion bus controller 38 preferably couples local bus 26 to expansion bus 40. In one embodiment, expansion bus 40 may be configured as an Industry Standard Architecture ("ISA") bus. Other buses, for example, a Peripheral Component Interconnect ("PCI") bus, may also be used.

In certain information handling system embodiments, expansion card controller 42 may also be included and is preferably coupled to expansion bus 40 as shown. Expansion card controller 42 is preferably coupled to a plurality of information handling system expansion slots 44. Expansion slots 44 may be configured to receive one or more computer components (not expressly shown) such as an expansion card (e.g., modems, fax cards, communications cards, and other input/output (I/O) devices).

Interrupt request generator 46 is also preferably coupled to expansion bus 40. Interrupt request generator 46 is preferably operable to issue an interrupt service request over a predetermined interrupt request line in response to receipt of a request to issue interrupt instruction from CPU 12.

I/O controller 48, often referred to as a super I/O controller, is also preferably coupled to expansion bus 40. I/O controller 48 preferably interfaces to an integrated drive electronics (IDE) hard drive device (HDD) 50, CD-ROM (compact disk-read only memory) drive 52 and/or a floppy disk drive (FDD) 54. Other disk drive devices (not expressly shown) which may be interfaced to the I/O controller include a removable hard drive, a zip drive, a CD-RW (compact disk-read/write) drive, and a CD-DVD (compact disk—digital versatile disk) drive.

Communication controller 56 is preferably provided and enables information handling system 10 to communicate with communication network 58, e.g., an Ethernet network. Communication network 58 may include a local area network (LAN), wide area network (WAN), Internet, Intranet, wireless broadband or the like. Communication controller 56 may be employed to form a network interface for communicating with other information handling systems (not expressly shown) coupled to communication network 58.

As illustrated, information handling system 10 preferably includes power supply 60, which provides power to the many components and/or devices that form information handling system 10. Power supply 60 may be a rechargeable battery, such as a nickel metal hydride ("NiMH") or lithium ion battery, when information handling system 10 is embodied as a portable or notebook computer, an A/C (alternating current) power source, an uninterruptible power supply (UPS) or other power source.

Power supply 60 is preferably coupled to power management microcontroller 62. Power management microcontroller 62 preferably controls the distribution of power from power supply 60. More specifically, power management microcontroller 62 preferably includes power output 64 coupled to main power plane 66 which may supply power to CPU 12 as well as other information handling system components. Power management microcontroller 62 may also be coupled to a power plane (not expressly shown) operable to supply power to an integrated panel display (not expressly shown), as well as to additional power delivery planes preferably included in information handling system 10.

Power management microcontroller 62 preferably monitors a charge level of an attached battery or UPS to determine when and when not to charge the battery or UPS. Power management microcontroller 62 is preferably also coupled to main power switch 68, which the user may actuate to turn information handling system 10 on and off. While power management microcontroller 62 powers down one or more portions or components of information handling system 10, e.g., CPU 12, display 36, or HDD 50, etc., when not in use to conserve power, power management microcontroller 62 itself is preferably substantially always coupled to a source of power, preferably power supply 60.

Computer system, a type of information handling system 10, may also include power management chip set 72. Power management chip set 72 is preferably coupled to CPU 12 via local bus 26 so that power management chip set 72 may receive power management and control commands from CPU 12. Power management chip set 72 is preferably connected to a plurality of individual power planes operable to supply power to respective components of information handling system 10, e.g., HDD 50, FDD 54, etc. In this manner, power management chip set 72 preferably acts under the direction of CPU 12 to control the power supplied to the various power planes and components of a system.

Real-time clock (RTC) 74 may also be coupled to I/O controller 48 and power management chip set 72. Inclusion of RTC 74 permits timed events or alarms to be transmitted to power management chip set 72. Real-time clock 74 may be programmed to generate an alarm signal at a predetermined time as well as to perform other operations.

Information handling system 10 is typically associated with chassis 70. Generally, chassis 70 is referred to as the computer case or case that encloses the some of the components within information handling system 10. However, other components such as CD 52, floppy 54 and HDD 50, may be placed internal to chassis 70 and/or separately from chassis 70 in stand-alone enclosure (shown below in more detail) or connected in series.

The computer components may be communicatively connected to information handling system 10 via bus 104, as shown below in more detail, or through a point to point link. In some embodiments, information handling system 10 may include storage system (described below in more detail) that uses a SCSI, Fibre Channel or other standard for communications between components or devices and the system. One example of a point to point link in SAS storage subsystem may include a group of links also known as a "fabric" that uses a Fibre Channel standard for interfacing between controllers and drives.

Figure 2A:
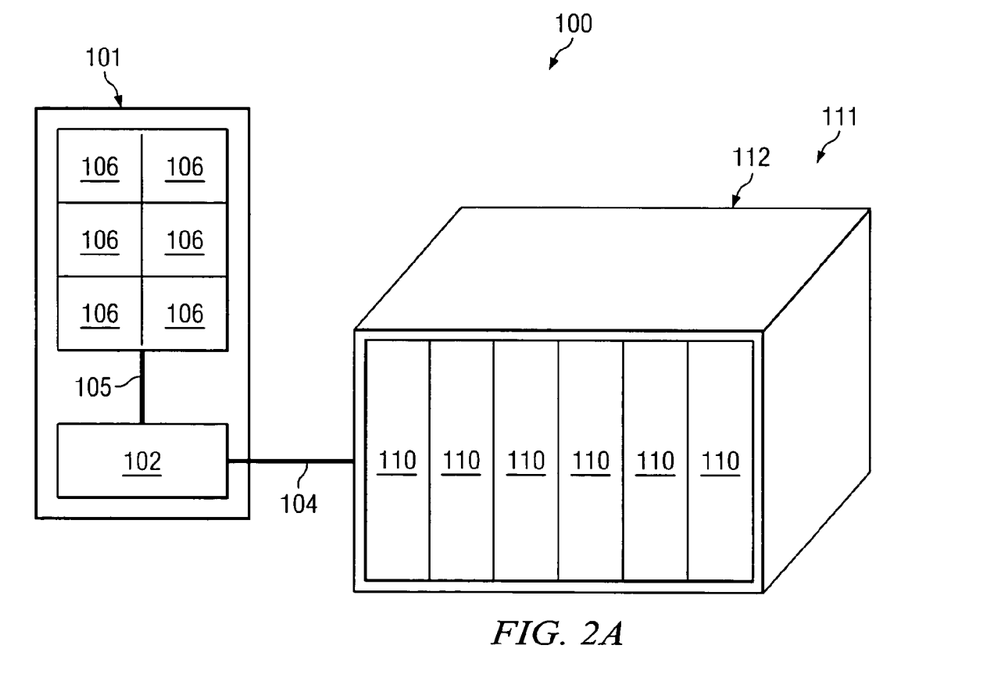
FIG. 2A is a block diagram showing an example embodiment of a storage system including a controller mounted on an internal backplane having hard disk drives (HDD) and a stand-alone enclosure coupled to the controller having additional HDD connected via a SCSI bus, according to teachings of the present disclosure.
Figure 2B:
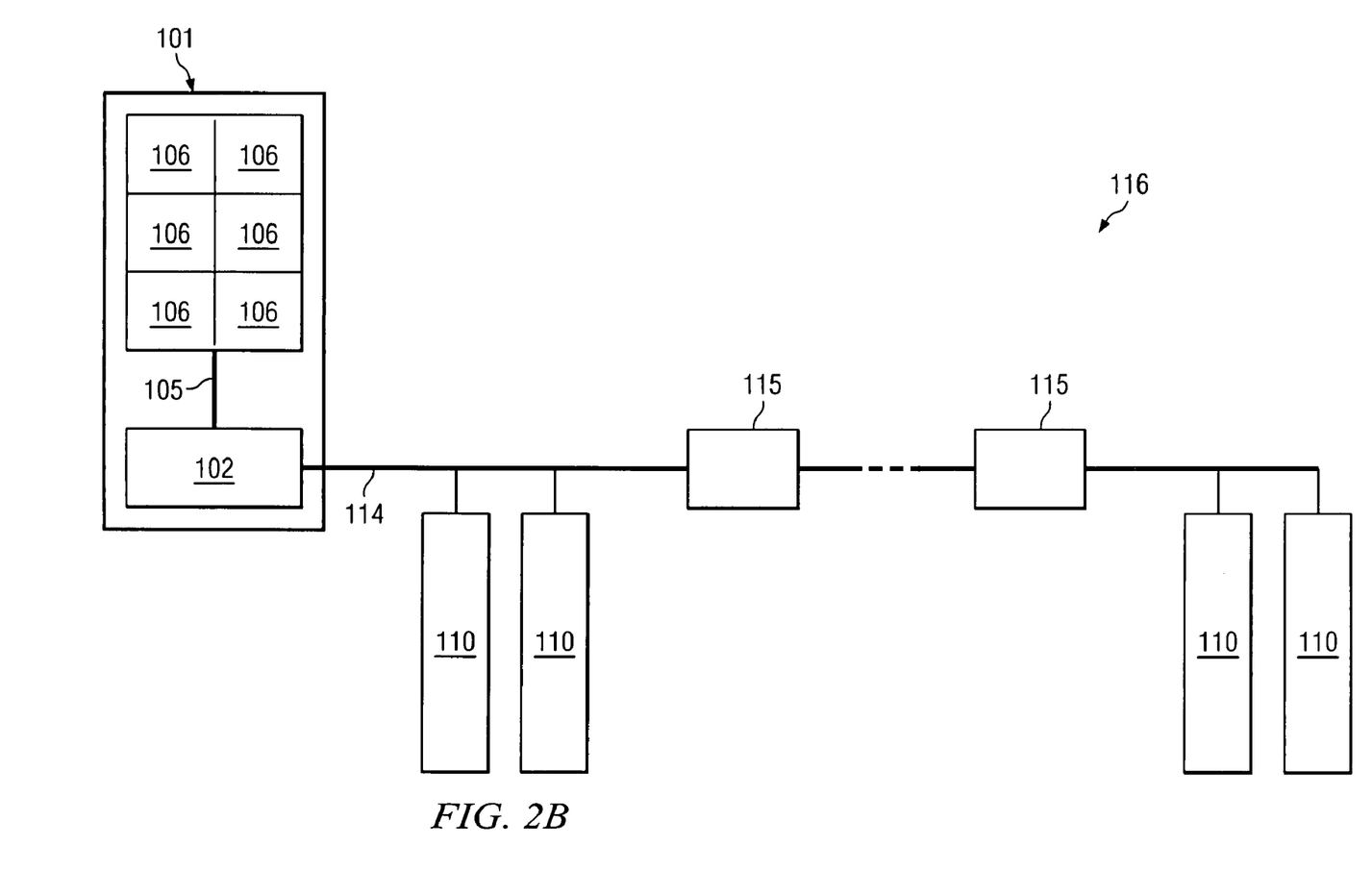
FIG. 2B is a block diagram showing an example embodiment of a storage system including a controller mounted on an internal backplane having hardware devices such as HDD connected via a point to point link, according to teachings of the present disclosure.

FIGS. 2A and 2B are block diagrams showing example embodiments of storage system 100 including respective SCSI storage subsystem 111 and SAS storage subsystem 116. Each storage subsystem 100 including controller 102 mounted on internal backplane 101 having hard disk drives (HDD) 106. SCSI storage subsystem 111 further includes stand-alone enclosure 112 which typically includes I/O expanders coupled to controller 120 having additional SCSI devices such as HDD 110 connected via SCSI bus 104. SAS storage system 116 further includes additional SCSI devices such as HDD 110 interconnected via point to point link 114. In some embodiments, SAS storage subsystem 116 may further include expanders 115 operable to regenerate, reshape, and retransmit a SCSI signal to additional SCSI devices such as HDD 110 interconnected via point to point link 114.

A typically SCSI/SAS storage system such as storage system 100 may include a plurality of hardware or SCSI devices such as internal hard disk drives 106 and external hard disk drives 110 that are connected via I/O expanders. Other examples of SCSI devices include tape drives (not expressly shown) and compact disk drives (not expressly shown).

Generally, I/O expanders allow SCSI devices to connect to storage system 100. I/O expanders may include SCSI expanders 115 including expander chips (not expressly shown), internal backplane 101 and enclosure 112 that have connections for SCSI devices to communicate with storage system 100 via a SCSI bus such as internal bus 105 and external bus 104. Examples of enclosures 112 include a PowerVault 220 system and a PowerVault 210 system manufactured by Dell, Inc. Because the SCSI devices may reside at different locations or configurations within storage system 100, controller 102 may be used to direct communications to the address associated with each SCSI device.

SAS storage subsystem 116 may further include one or more SCSI expanders 115 that are used to link or interconnect with one or more hardware device such as HDD 110. However, there is not necessarily one SCSI expander per hardware device such as hard disk drive 110.

Each hardware or SCSI device within storage system 100 may be represented as a SCSI target. Each SCSI device may include an address for communications between a processor and memory (not expressly shown) in storage system 100 via an I/O controller such as controller 102 shown on internal backplane 101. Controller 102 may direct information between the SCSI devices via internal bus 105 or external bus 105.

Generally, the connections on SCSI devices are interchangeable such that an internal SCSI device such as internal HDD 106 may be placed in enclosure 112, having an I/O expander. Similarly, external HDD 110 may connect to internal backplane 101 in lieu of internal HDD 106.

Even though the SCSI devices may physically connect at the different locations, compatibility issues may arise such as the device is not supported. Thus, controller 102 may perform a scan for devices placed on interconnections such as bus 104 and point to point link 114 for devices associated with storage system 100 to identify potential compatibility issues. For example, compatibility issues may arise between a combination of the SCSI controller and an SCSI hardware device, SCSI controller and an attached enclosure, the enclosure and an SCSI device, and the SCSI device and another SCSI device.

Figure 3:
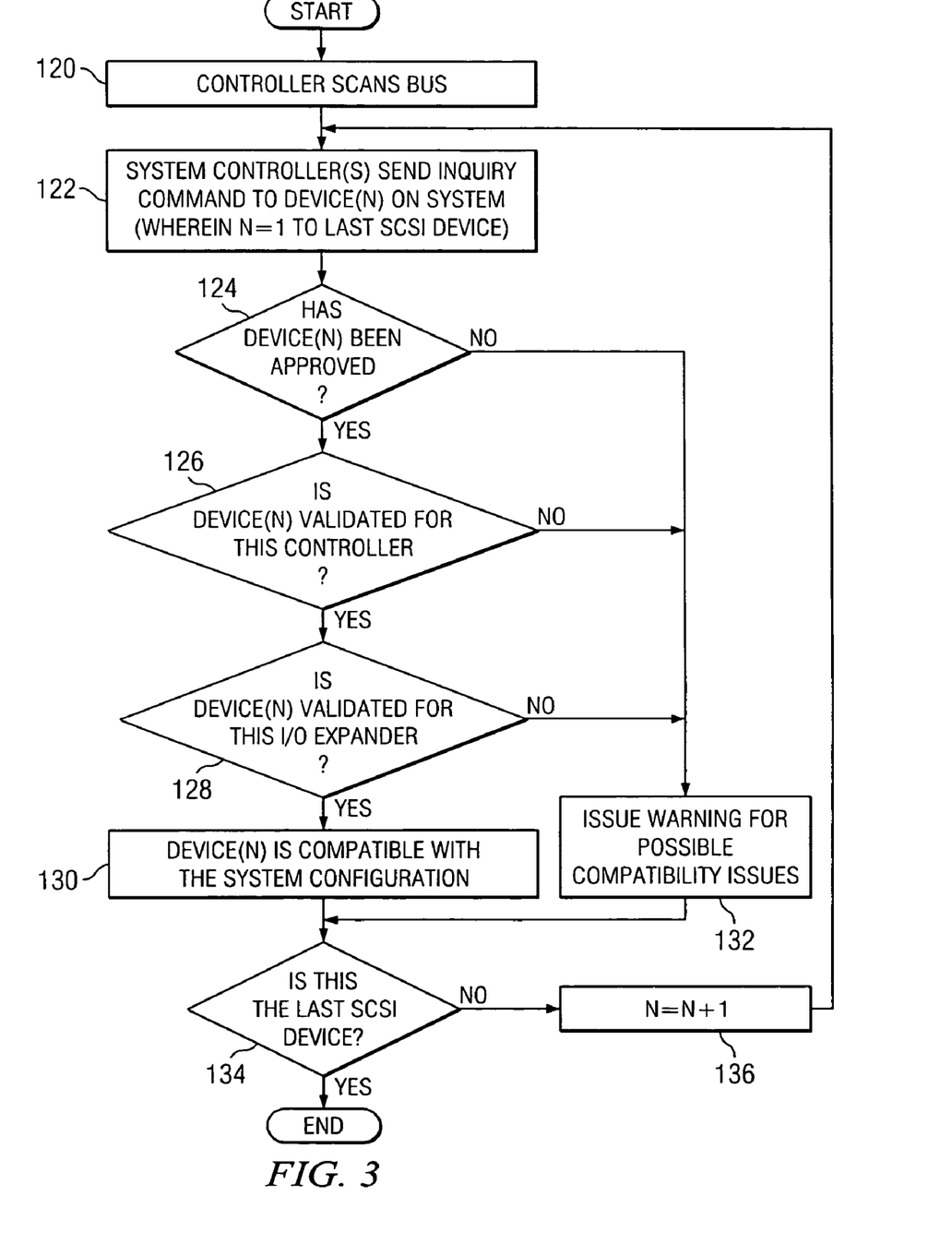
FIG. 3 is a flow chart for determining the compatibility of supported devices on the SCSI bus, according to teachings of the present disclosure.

FIG. 3 is a flow chart for determining the compatibility of supported devices on SCSI bus 104 and 105. Although not specifically described below, point to point link 114 may alternatively be substituted for SCSI bus 104. At block 120, controller 102 scans a SCSI interconnection such as SCSI bus 104 and 105 to determine how many SCSI devices are attached to storage system 100. Typically, the scan is initiated upon boot-up, usually during the power-on self test (POST) operation, of storage system 100.

System scans may also be initiated upon a change or alteration of the configuration of storage system 100. Similarly, a scan may also be initiated upon the relocation of one or more of the SCSI hardware devices within the system. For example, internal HDD 106 may be replaced with external HDD 110 and upon such replacement storage system 100 detects the change in configuration to cause the scan to be initiated.

Following the scan of the system, controller 102 sends an inquiry command to each SCSI hardware device on the system, as shown in block 122. In other embodiments, compatibility information may be obtained via a mode select command. Because a determination is made for each device on the system, the method typically repeats the process for each SCSI device. However, in some instances, the inquiry command may take place simultaneously with all devices located on the SCSI interconnection.

Based on the inquiry command, each SCSI device typically responds with a supported device information matrix (shown below in more detail). The supported device information matrix generally includes a database of compatible configurations for the device. At block 124, controller 102 may or may not have received the supported device information matrix. If the SCSI device has responded with an information matrix, the SCSI will typically be an approved device. However if the device does not response with a supported device information matrix, the method proceeds to issue a possible incompatibility warning at block 132, wherein a user may be notified of a possible compatibility issue. Generally, the devices are validated for compatibility based on association with controller 102, the controller firmware (not expressly shown), a target such as a hardware device including hard disk drives 110, the target's firmware (not expressly shown) or the placement of the target within storage system 110 such as enclosure 112.

Based on the SCSI bus scan responding with the supported device information matrix, the device is considered approved such that controller 102 continues to determine the compatibility of the SCSI device based on the configuration. At block 126, controller 102 determines whether the SCSI hardware device is compatible or validated with controller 102 or any other controller located within storage system 100. Similarly, if a compatibility issue arises, the SCSI device may be deemed not valid or supported such that a warning is issued for a potential compatibility issue, at block 132.

If controller 102 is validated for the SCSI device, enclosure 112 or other I/O expander is validate against the SCSI device. Similarly, if the SCSI device is not supported or validated, the SCSI device may be deemed not valid or not compatible such that a warning is issued for a potential compatibility issue, at block 132

If the SCSI device has been approved, validated for controller 102 and validated for enclosure 112, the method determines that the SCSI device is compatible with the current configuration in storage system 100 as shown at block 130. Next, the method checks to determine if this is the last SCSI device determined in storage system 100 at block 134. If this is not the last SCSI device, the next SCSI device in the system is selected, as shown in block 136, wherein "Device(N)" is incremented to the next value as shown by "N=N+1". Thus, the method of determining compatibility is continued until all SCSI devices attached to the system are determined for compatibility issues.

Figure 4:
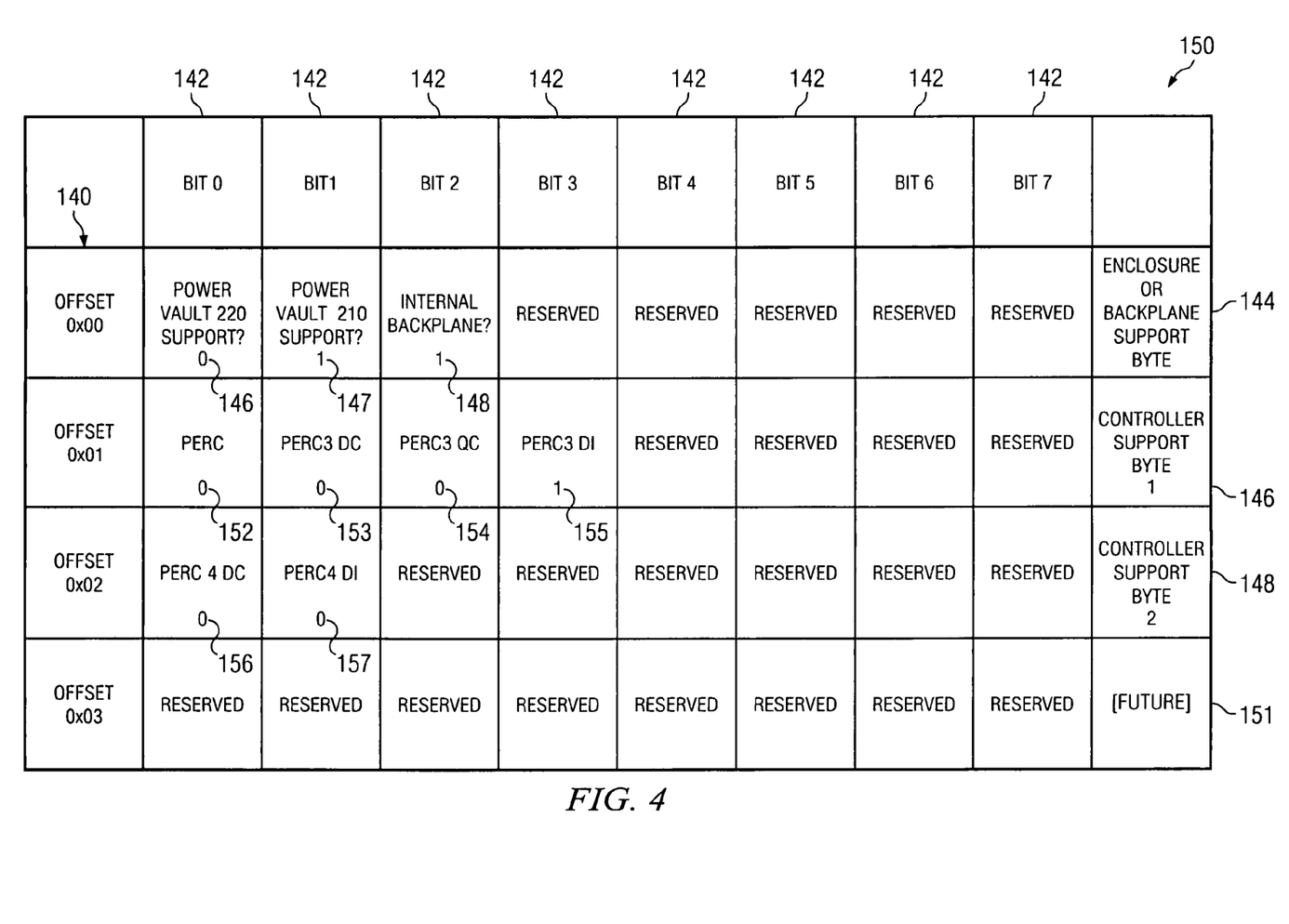
FIG. 4 illustrates an example embodiment of supported device information matrix having a data field of toggle bits that indicate compatibility of a hard disk drive with enclosures, backplanes and controllers, according to teachings of the present disclosure.

FIG. 4 illustrates an example embodiment of supported device information matrix 150 having data field of toggle bits that indicate compatibility of a hard disk drive with enclosures, backplanes and controllers of the system. Supported device information matrix 150 may represent one type of information matrix that is stored within each SCSI device. Information matrix 150 may include a variety of predefined toggle bits arranged in a standardized group that allows controller 102 to determine compatibility of each device connected on the SCSI interconnection or bus.

In the example embodiment of information matrix 150, data field includes four offsets 140 with each offset 140 having eight bits 142. By assigning each offset 140 a different support compatibility indication, the respective toggle bit in each bit 142 may represent a different component in the system for determining compatibility.

For example, OFFSET 0x00 144 may be reserved for determine whether a particular enclosure or backplane is supported by the SCSI device as shown in box 144. To that end, each bit 142 along OFFSET 0x00 may represent one particular type of enclosure or backplane for which compatibility has been determined. As such, the value contained within bit 142 is either a "0" or a "1" value. Generally, the bit 142 may be set to a "0" value indicating that the device is not supported for that particular enclosure or backplane as shown for the PowerVault 220 system enclosure 146. However, for this particular hard disk drive, both the PowerVault 210 system enclosure 147 and an internal backplane 148 support the drive. As for the spaces marked "Reserved," namely bits 3–7, these bits 142 are for additional enclosures or backplanes for which compatibility is determined.

Similarly for OFFSET 0x01 146 and OFFSET 0x02 148, supported device information matrix 150 includes the supported controllers for the hard disk drive. For example, a PERDC 3Di controller supports the hard disk drive as shown in box 155 but PERC 152, PERC 3 DC 153 and PERC 3 QC 154 do not support the hard disk drive as shown by bits 0–3 of OFFSET 0x01 146. Likewise, PERC 4 DC 155 and PERC 4 DI 157 do not support the hard disk drive as shown by bits 0–1 of OFFSET 0x02. Regarding the spaces marked "Reserved," these bits 142 are for additional controllers for which compatibility is determined.

Lastly, OFFSET 0x03 151 is saved for "future" components that may be coupled to the SCSI bus. Similarly, "Bits 0–7" 142 are designated as "Reserved" such that additional components may be added to supported device information matrix 150 as compatibility is determined for the device with respect to the hard disk drive.

Although the disclosed embodiments have been described in detail, it should be understood that various changes, substitutions and alterations can be made to the embodiments without departing from their spirit and scope.

What is claimed is:

1. A method of hardware validation in an information handling system, comprising:

scanning an interconnection of the information handling system to identify hardware devices attached to the interconnection;

determining interconnection compatibility of an identified hardware device based on a supported device information matrix and a location of the hardware device in the information handling system;

based on the determination, displaying a validation notification to a user for possible compatibility issues; and wherein the identified hardware device comprises a storage device and wherein determining interconnection compatibility comprises determining physical compatibility between the identified hardware device and a corresponding I/O expander and determining compatibility between the identified hardware device and a corresponding I/O controller.

2. The method of claim 1, wherein the scanning of the interconnection farther comprises performing the scan during a power on self test (POST) or boot-up sequence of the information handling system.

3. The method of claim 1, wherein the scanning of the interconnection farther comprises performing the scan based on a change in configuration of the information handling system.

4. The method of claim 3, wherein the change in the configuration comprises the addition or removal of at least one of the hardware devices in the information handling system.

5. The method of claim 3, wherein the change in the configuration comprises the relocation of at least one of the hardware devices within the information handling system.

6. The method of claim 1, wherein determining the compatibility further comprises performing a target firmware check.

7. The method of claim 1, further comprising storing a data field of toggle bits in a supported device information matrix associated with each hardware device, each toggle bit operable to indicate compatibility of the associated hardware device based on a configuration of the information handling system.

8. The method of claim 1, further comprising initiating the scan using a mode select command.

9. The method of claim 1, further comprising determining the compatibility of the hardware device based on system configuration of the information handling system.

10. The method of claim 1, further comprising determining compatibility issues based on configuration of a controller, a hardware device and an input/output expander in the information handling system.

11. A system for small computer system interface (SCSI) and SAS hardware validation in an information handling system comprising:

an input/output (I/O) expander operable to receive one or more hardware devices such that the one or more hardware devices communicatively couples to a SCSI interconnection in the information handling system;

a supported device information matrix stored in each of the one or more hardware devices, the supported device information matrix operable to indicate compatibility of the respective hardware device placed within the information handling system;

a controller communicatively coupled to the SCSI interconnection, the controller operable to scan the SCSI interconnection for the one or more hardware devices and to determine compatibility of the one or more hardware devices as configured in the information handling system based on the supported device information matrix; and wherein determining interconnection compatibility comprises determining physical compatibility between the identified hardware device and a corresponding I/O expander and determining compatibility between the identified hardware device and a corresponding I/O controller.

12. The system of claim 11, further comprising the I/O expander selected from a group consisting of an internal backplane, an enclosure and a SCSI expander.

13. The system of claim 11, further comprising the SCSI interconnection selected from a group consisting of a point to point link and a bus.

14. The system of claim 11, further comprising the one or more hardware devices selected from a group consisting of hard disk drives, tape drives and compact disk drives.

15. The system of claim 11, further comprising a validation notification operable to indicate compatibility issues with each hardware device as configured in the information handling system.

16. The system of claim 11, wherein the supported device information matrix further comprises a data field of toggle bits, each toggle bit operable to indicate compatibility of the associated hardware device with one configuration of the information handling system.

17. An information handling system comprising:

a processor;

a memory communicatively coupled to the processor, the memory and processor operably coupled to a bus;

an input/output (I/O) expander operable to receive one or more hardware devices such that the one or more hardware devices communicatively couple to the bus via the I/O expander;

an I/O controller coupled to the I/O expander;

a supported device information matrix stored in each of the one or more hardware devices, the supported device information matrix operable to indicate compatibility between a location of the respective hardware device and a configuration of the information handling system;

executable instructions, stored in a storage of said information handling system, operable to scan the bus for the one or more hardware devices and to determine compatibility of the one or more hardware devices as configured in the information handling system based on the supported device information matrix; and wherein determining compatibility comprises determining physical compatibility between the identified hardware device and a corresponding I/O expander and determining compatibility between the identified hardware device and a corresponding I/O controller.

18. The information handling system of claim 17, wherein the one or more hardware devices are selected from a group consisting of hard disk drives, tape drives and compact disk drives.

19. The information handling system of claim 17, wherein the I/O expander is selected from a group consisting of an internal server backplane, an enclosure and a small computer system interface expander.

20. The information handling system of claim 17, wherein the supported device information matrix further comprises a data field of toggle bits, each toggle bit operably indicates compatibility of the associated hardware device.

* * * * *